(12) United States Patent
Wang

(10) Patent No.: US 7,996,613 B2
(45) Date of Patent: Aug. 9, 2011

(54) ELECTRONIC DEVICE USING MEMORY TO EXPAND STORAGE CAPACITY

(75) Inventor: Jen-Chun Wang, Taipei County (TW)

(73) Assignee: Portwell Inc., Jhonghe, Taipei County (TW)

( * ) Notice: Subject to any disclaimer, the term of this patent is extended or adjusted under 35 U.S.C. 154(b) by 549 days.

(21) Appl. No.: 12/232,031

(22) Filed: Sep. 10, 2008

(65) Prior Publication Data
US 2010/0064087 A1    Mar. 11, 2010

(51) Int. Cl.
*G06F 12/00* (2006.01)
(52) U.S. Cl. .......... 711/115; 711/2; 711/5; 711/170
(58) Field of Classification Search .......... 711/2, 5, 711/115, 170
See application file for complete search history.

(56) References Cited

U.S. PATENT DOCUMENTS

| | | | |
|---|---|---|---|
| 5,563,400 A * | 10/1996 | Le Roux | 235/486 |
| 6,952,744 B2 * | 10/2005 | Farnworth et al. | 710/13 |
| 7,233,489 B2 * | 6/2007 | Toyama et al. | 361/679.31 |
| 7,525,807 B2 * | 4/2009 | Ohta et al. | 361/737 |
| 7,713,091 B2 * | 5/2010 | Chen | 439/630 |
| 2002/0078297 A1 * | 6/2002 | Toyama et al. | 711/115 |
| 2007/0180177 A1 * | 8/2007 | Jones et al. | 710/301 |
| 2008/0101046 A1 * | 5/2008 | Lee | 361/767 |
| 2010/0068937 A1 * | 3/2010 | Chen | 439/628 |

* cited by examiner

*Primary Examiner* — Jack A Lane
(74) *Attorney, Agent, or Firm* — Muncy, Geissler, Olds & Lowe, PLLC

(57) ABSTRACT

The present invention discloses an electronic device using a memory to expand storage capacity, and the device includes a main board and a data storage module. The main board includes at least one interface card slot, and the data storage module includes at least one storage interface card, and a plurality of memory slots disposed on the storage interface card for movably inserting a memory. The memory is for storing data, and the storage interface card is inserted into the interface card slot. With the memory slot on the storage interface card, the memory can be expanded conveniently, and the storage capacity can be increased dynamically as needed. The invention also enhances the security, performance, and vibration resisting function of the data storage.

12 Claims, 6 Drawing Sheets

ELECTRONIC DEVICE USING MEMORY TO EXPAND STORAGE CAPACITY

BACKGROUND OF THE INVENTION

1. Field of the Invention

The present invention relates to a data storage apparatus of an electronic device, and more particularly to the apparatus of using a memory to expand the data storage capacity of the electronic device as well as enhancing its performance and security.

2. Description of the Related Art

As present existing electronic devices such as personal computer (PC), industrial computer (IPC) include a storage device such as a hard disk in a PC structure as shown in FIG. 1. The prior art includes a main board 90 having a microprocessor 91 and a storage device control interface 92, and the storage device control interface 92 is electrically coupled to one or more hard disks 94 through an electric circuit 93, and the storage device control interface 92 supports transmission protocols including Integrated Device Electronic (IDE), Peripheral Component Interface (PCI) and Serial ATA (SATA). Since the hard disks 94 come with a specific storage capacity, it is necessary to replace the hard disk with another hard disk with a larger storage capacity if a user wants to expand the storage capacity of the hard disk 94, but such expansion always causes a waste of resources, and users have to reinstall the system software and data into the computer, and thus incurring higher cost and more manpower. The user also can add another hard disk 95 for the memory expansion, but such expansion method occupies more spaces and the operation is relatively inconvenient. In the meantime, hard disk is a high precision product, and its operation mainly uses a control circuit to move a pickup hard at a high speed on a system board of the hard disk, and thus the hard disk cannot be vibrated or shaken during its operation. As science and technology advance, hard disks are used extensively in electronic devices of a transportation means such as a motor vehicle or a ship. To overcome the shortcoming of the hard disk, manufacturers use a flash memory in various different storage devices such as Super Density or Secure Digital (SD) card, Compact Flash (CF) card, Memory Stick (MS) card, Multi Media Card (MMC), Smart Card (SM) or USB storage device, and these memory storage devices have become common accessory devices that can be installed, expanded and hot plugged easily, and also come with the advantages of high security, low heat energy, and good performance and vibration resistance. However, the storage capacity of such memory storage devices is very limited, and cannot become a mainstream of storage devices. In a general electronic device (such as a computer), card readers in various different specifications are installed on a panel of the computer, so that these memory storage devices can be used as portable storage media only, but their application cannot be used fully. Therefore, it is an important subject for related manufacturers and engineers to find a way of expanding the storage capacity of a storage device of an electronic device and further enhancing the application of a memory storage device.

In view of the shortcomings of the present existing storage devices with an inconvenient way of expanding their storage capacity, the inventor of the present invention based on years of experience in the related industry to conduct extensive researches and experiments, and finally developed a dynamic, convenient, safe and efficient way of expanding the storage capacity to overcome the shortcomings of the prior art.

SUMMARY OF THE INVENTION

Therefore, it is a primary objective of the present invention to provide an electronic device using a memory to expand storage capacity, wherein the electronic device includes a plurality of memory slots for inserting memories, so that the storage capacity can be expanded by the memory anytime. In addition, the installation and operation for expanding the memory is simple and easy, and the security, efficiency and vibration-resisting function of the storage device can be enhanced as well.

To achieve the foregoing objective and effect, the present invention adopts a technical measure comprising: a main board having at least one interface card slot; a data storage module, having a storage interface card inserted into the interface card slot, and a plurality of memory slots disposed on the storage interface card for movably inserting a plurality of memories.

The technical measure of the present invention further comprises: a main board, having a plurality of interface card slots; a data storage module, having at least two storage interface cards inserted into the interface card slots respectively, and a plurality of memory slots disposed on the storage interface cards for movably inserting a plurality of memories.

To make it easier for our examiner to understand the technical characteristics and effects of the present invention, we use preferred embodiments with accompanying drawings for the detailed description of the present invention as follows.

DETAILED DESCRIPTION OF THE PREFERRED EMBODIMENTS

Figure 1:
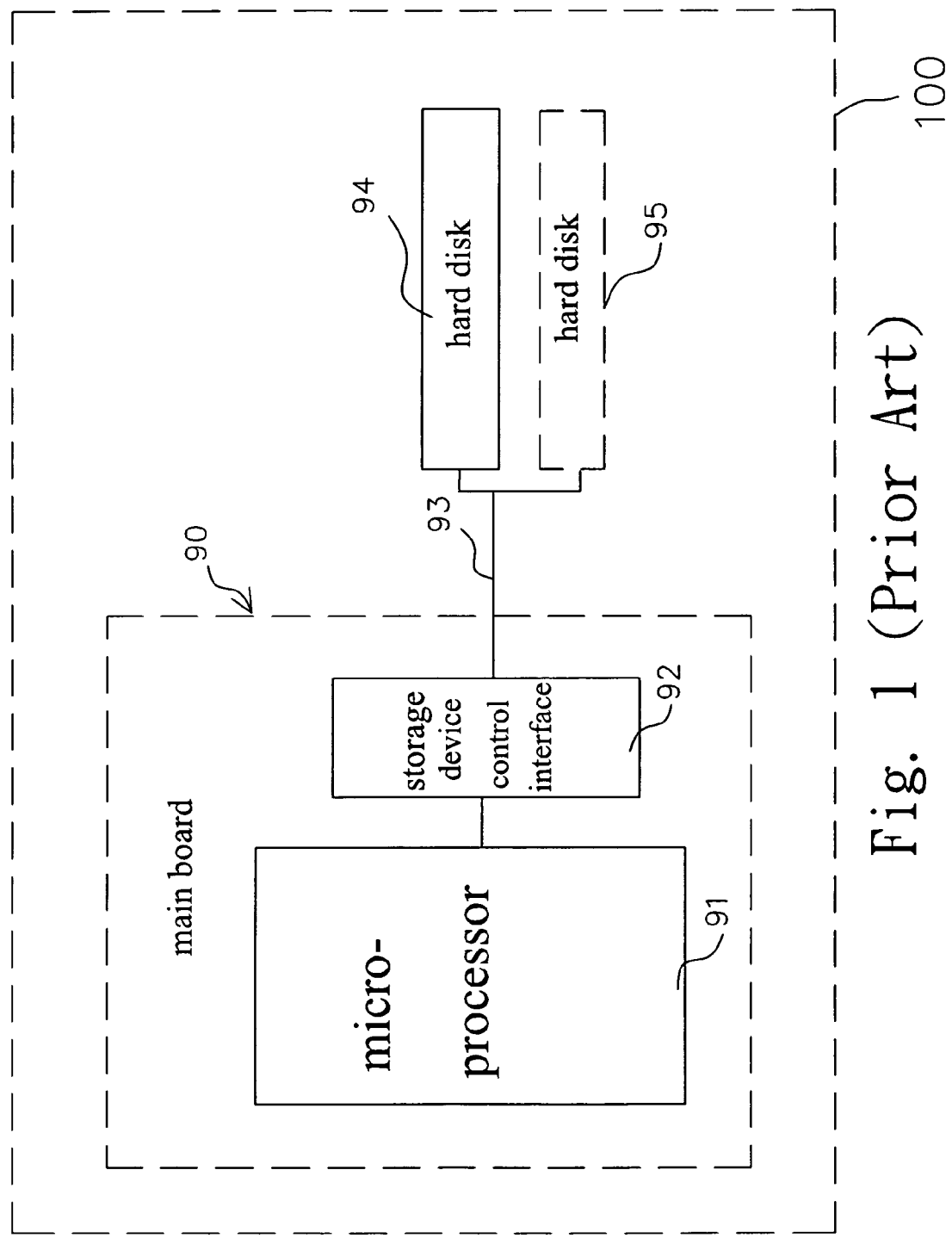
FIG. 1 is a schematic view of a conventional hard disk storage device.
Figure 2:
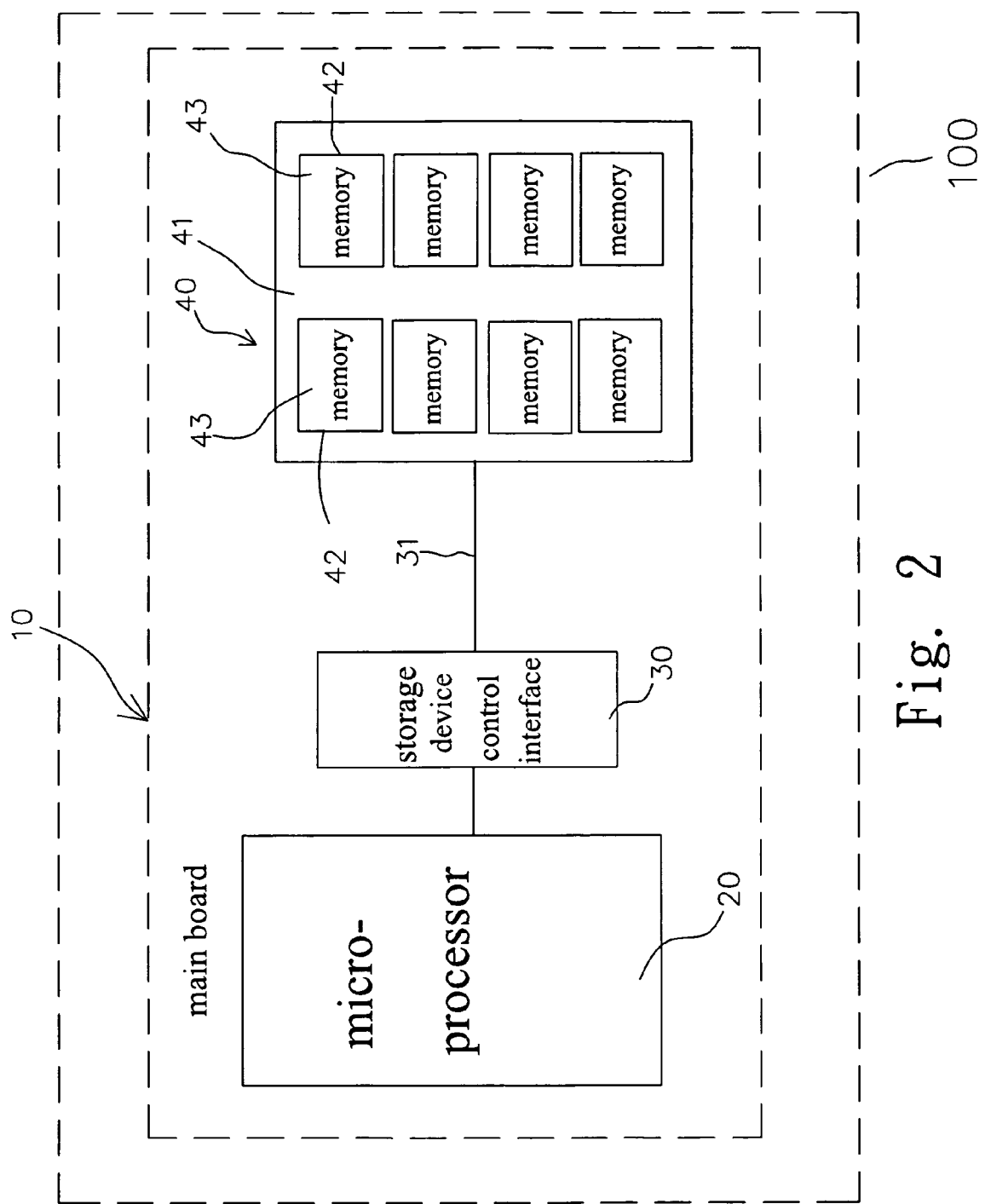
FIG. 2 is a schematic view of an apparatus in accordance with a first preferred embodiment of the present invention.

With reference to FIG. 2 for an electronic device which is a personal computer using a memory to expand storage capacity in accordance with a first preferred embodiment of the present invention, the electronic device comprises a main board 10 and a data storage module 40. The main board 10 includes a microprocessor 20 and a storage device control interface 30, wherein the storage device control interface 30 is electrically coupled to the microprocessor 20 and the data storage module 40 through an electric circuit 31, and the storage device control interface 30 supports transmission protocols including Peripheral Component Interface (PCI), External Serial ATA (ESATA), and Personal Computer Memory Card International Association (PCMCIA). The data storage module 40 installed on the main board 10 includes a storage interface card 41 and a plurality of memories 43, and the storage interface card 41 includes a plurality of memory slots 42 for inserting the memories 43, wherein the memory slot 42 and memory 43 fit various specifications of memories including Super Density or Secure Digital (SD) card, Compact Flash (CF) card, Memory Stick (MS) card, Multi Media Card (MMC), Smart Card (SM).

Figure 3:
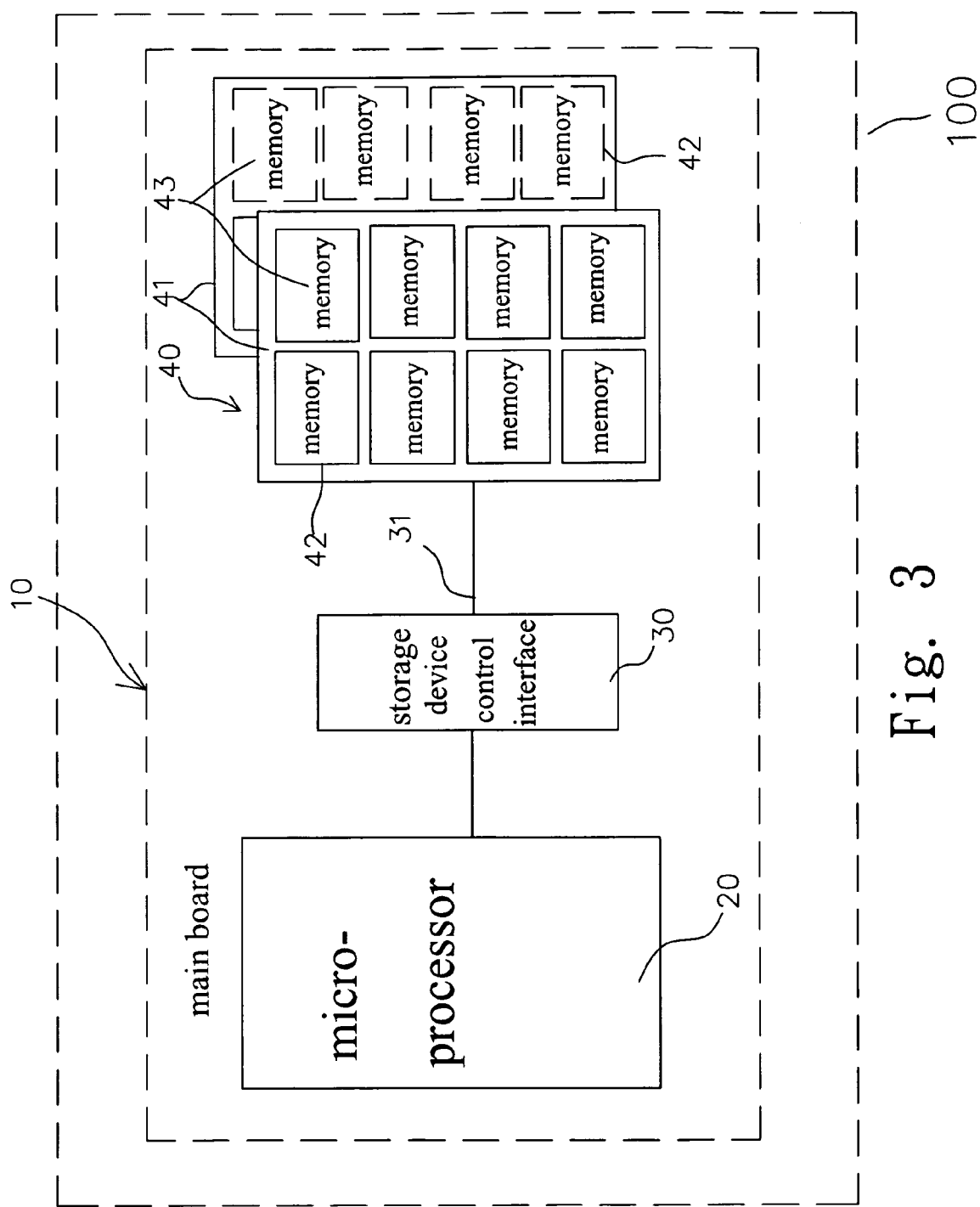
FIG. 3 is a schematic view of an apparatus in accordance with a second preferred embodiment of the present invention.

With reference to FIG. 3 for an electronic device using a memory to expand storage capacity in accordance with a second preferred embodiment of the present invention, the difference of this embodiment from the first preferred embodiment resides on that the data storage module 40 includes at least two storage interface card 41 and a plurality of memories 43, wherein the storage interface cards 41 include a plurality of memory slots 42 for inserting the memories 43.

Figure 4:
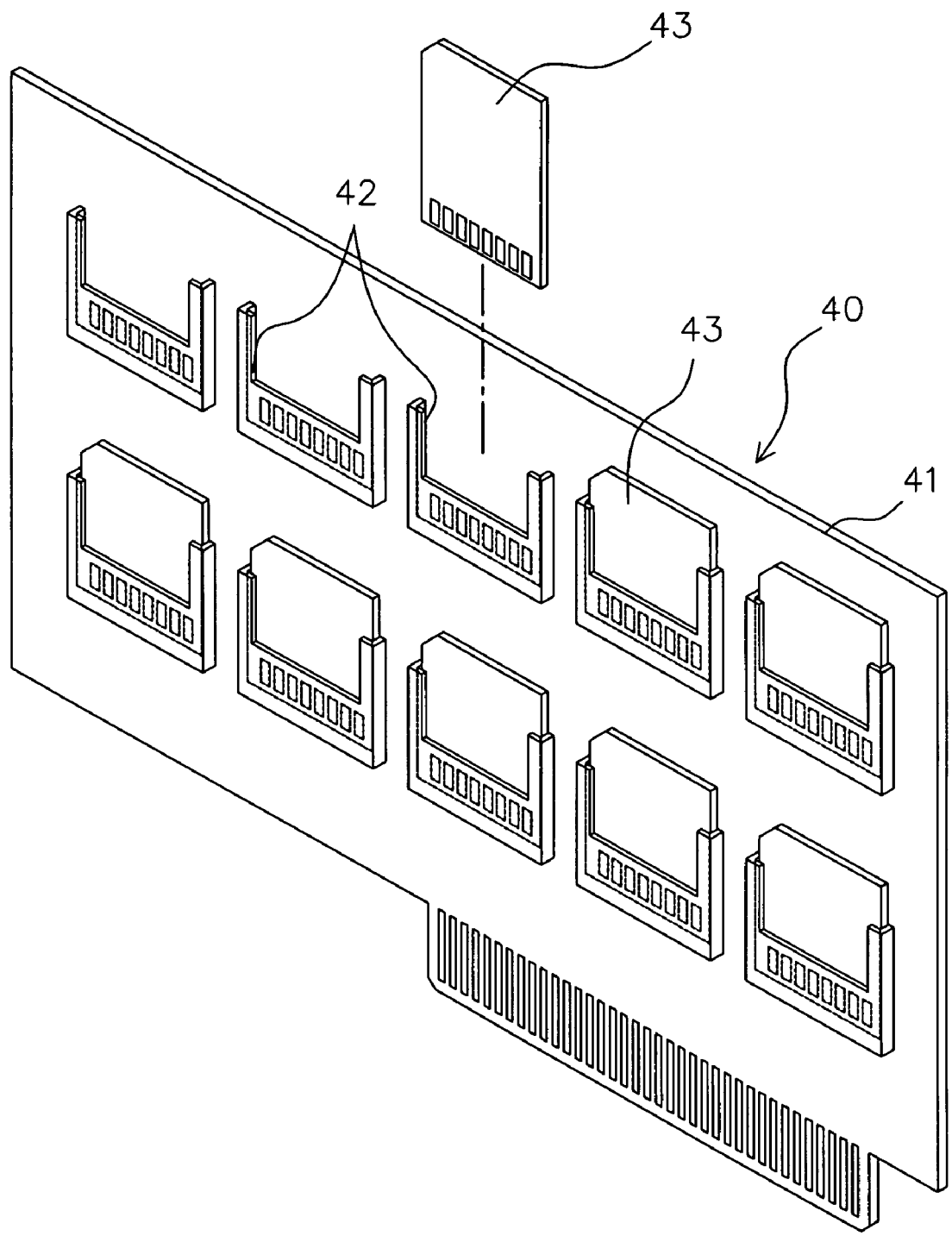
FIG. 4 is an exploded view of a storage device of the present invention.
Figure 5:
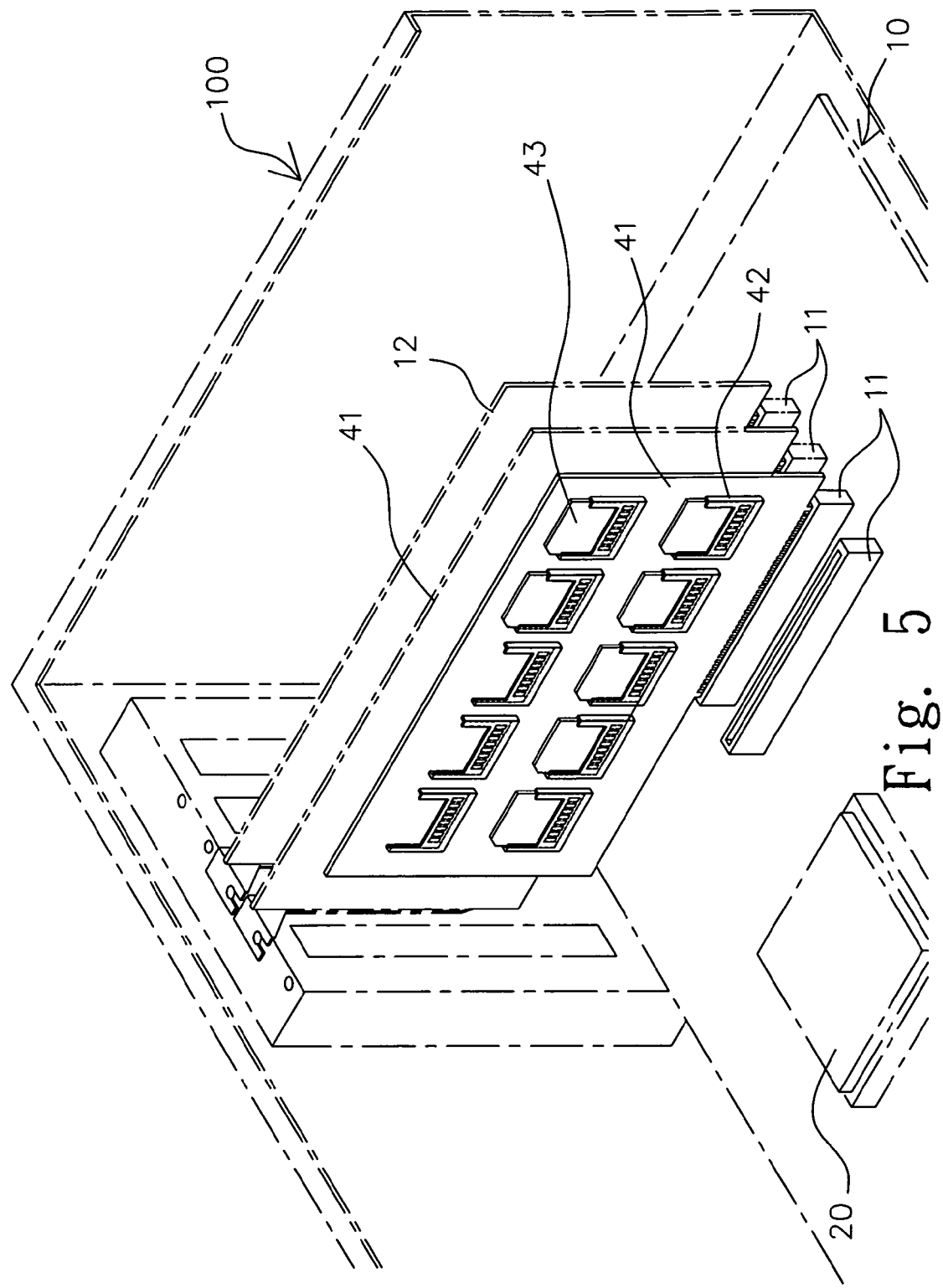
FIG. 5 is a schematic view of an application of the present invention.
Figure 6:
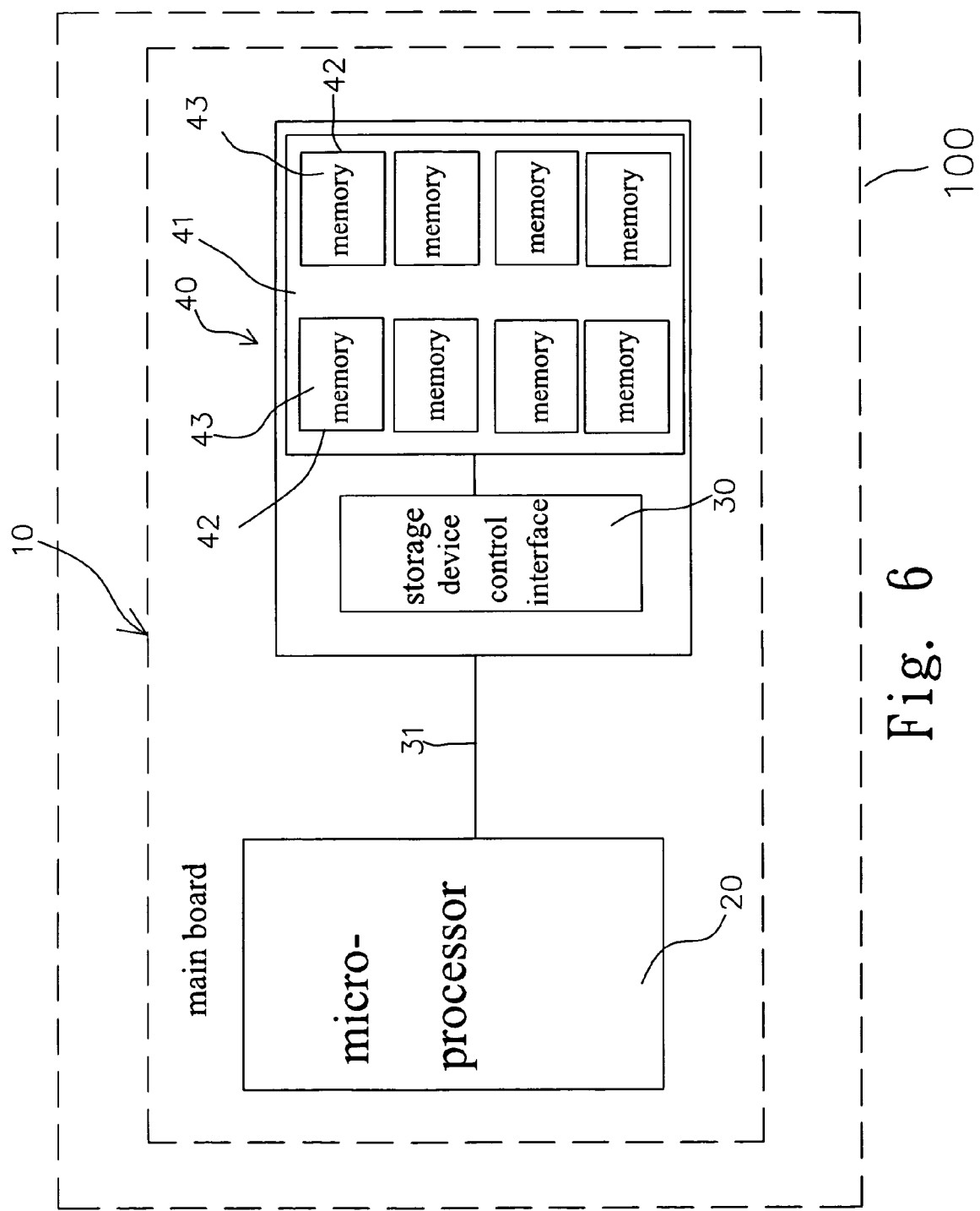
FIG. 6 is a schematic view of an apparatus in accordance with a third preferred embodiment of the present invention.

With reference to FIGS. 4 to 6, the main board 10 is installed in an electronic device 100, and the main board 10 includes a plurality of interface card slots 11 for inserting various different interface cards 12 (such as a display card, an audio card, and a network card, etc), and the interface card slot 11 is provided for inserting at least one storage interface card 41. In the meantime, the interface card slot 11 is electrically coupled to the storage device control interface 30 and the microprocessor 20 through the electric circuit 31. The storage interface card 41 includes a plurality of memory slots 42, and the memory slot 42 supports different specifications of memories including Super Density or Secure Digital (SD) card, Compact Flash (CF) card, Memory Stick (MS) card, Multi Media Card (MMC) and Smart Card (SM).

With reference to FIG. 6 for an electronic device using a memory to expand storage capacity in accordance with a third preferred embodiment of the present invention, the difference of this embodiment from the foregoing preferred embodiments resides on that the storage device control interface 30 is installed on the storage interface card 41, and the storage device control interface 30 is electrically coupled the microprocessor 20 and the data storage module 40 through the electric circuit 31.

When the electronic device using a memory to expand storage capacity in accordance with the present invention is applied, the memory 43 is inserted into the memory slot 42 of the storage interface card 41 to define an electric connection. Since the storage interface card 41 includes a plurality of memory slots 42, the quantity of memories 43 installed on the memory slot 42 can be changed flexibly, so that the remaining memory slots 42 can be used for adding memory 43 when there is a need to expand the storage capacity later, so as to complete the expansion of storage capacity simply and conveniently. If a single memory slot 42 of the storage interface card 41 is installed with memories 43, the remaining interface card slots 11 on the main board 10 further includes a storage interface card 41 for satisfying the requirement of expanding the storage capacity.

Since the present invention uses a built-in interface card slot to work together with a storage interface card and a memory to make the expansion of storage capacity much simpler, easier and more dynamic, and the memory storage device can be a ReadyBoost (a boost device provided by Windows Vista) to improve the system response speed of an electronic device (such as a computer), and access memory with a speed faster than the access of a hard disk, so as to enhance the system performance of the electronic device.

Therefore, the memory slot in the electronic device can be used for inserting a flash memory storage device conveniently to dynamically expand its storage capacity simply and conveniently as needed, and, enhance the security, efficiency and vibration resistance of the storage device in the electronic device.

While the invention has been described by means of specific embodiments, numerous modifications and variations could be made thereto by those skilled in the art without departing from the scope and spirit of the invention set forth in the claims.

What is claimed is:

1. An electronic device using a memory to expand storage capacity, comprising:
   a main board, including a microprocessor and at least one interface card slot;
   a data storage module, including a storage interface card inserted into said interface card slot, and a plurality of memory slots disposed on said storage interface card; and
   a memory, inserted into one or more of said memory slots, for storing data of said electronic device.

2. The electronic device using a memory to expand storage capacity according to claim 1, wherein said main board further includes a storage device control interface electrically coupled to said microprocessor and said data storage module through an electric circuit.

3. The electronic device using a memory to expand storage capacity according to claim 1, wherein said storage interface card further includes a storage device control interface electrically coupled to said microprocessor and said data storage module through an electric circuit.

4. The electronic device using a memory to expand storage capacity according to claim 2, wherein said storage device control interface supports Peripheral Component Interface (PCI), External Serial ATA (ESATA), and Personal Computer Memory Card International Association (PCMCIA) transmission protocols.

5. The electronic device using a memory to expand storage capacity according to claim 3, wherein said storage device control interface supports Peripheral Component Interface (PCI), External Serial ATA (ESATA), and Personal Computer Memory Card International Association (PCMCIA) transmission protocols.

6. The electronic device using a memory to expand storage capacity according to claim 1, wherein said memory supports SD card, CF card, MS card, MMC card and SM card specifications.

7. An electronic device using a memory to expand storage capacity, comprising:
   a main board, having at least two interface card slots;
   a data storage module, having at least two storage interface cards, inserted into said interface card slots, and a plurality of memory slots disposed on said storage interface cards respectively; and
   a memory, inserted into one or more of said memory slots, for storing data of said electronic device.

8. The electronic device using a memory to expand storage capacity according to claim 7, wherein said main board further includes a storage device control interface electrically coupled to said microprocessor and said data storage module through an electric circuit.

9. The electronic device using a memory to expand storage capacity according to claim 7, wherein said storage interface card further includes a storage device control interface electrically coupled to said microprocessor and said data storage module through an electric circuit.

10. The electronic device using a memory to expand storage capacity according to claim 8, wherein said storage device control interface supports Peripheral Component Interface (PCI), External Serial ATA (ESATA), and Personal Computer Memory Card International Association (PCMCIA) transmission protocols.

11. The electronic device using a memory to expand storage capacity according to claim 9, wherein said storage device control interface supports Peripheral Component Interface (PCI), External Serial ATA (ESATA), and Personal Computer Memory Card International Association (PCMCIA) transmission protocols.

12. The electronic device using a memory to expand storage capacity according to claim 7, wherein said memory supports SD card, CF card, MS card, MMC card and SM card specifications.

* * * * *